United States Patent [19]

Lebrero Martinez et al.

[11] Patent Number: 5,104,257
[45] Date of Patent: Apr. 14, 1992

[54] VIBRATION INSULATION SYSTEM IN COMPACTORS

[75] Inventors: Amancio Lebrero Martinez; Pedro Lebrero Martinez, both of Zaragoza, Spain

[73] Assignee: Construcciones Maquinaria Obras Publicas Lebrero, S.A., Juan de la Cierva, Spain

[21] Appl. No.: 530,885

[22] Filed: May 30, 1990

[30] Foreign Application Priority Data

Jun. 2, 1989 [ES] Spain ................................. 8901934
Jun. 2, 1989 [ES] Spain ................................. 8901941
Jun. 2, 1989 [ES] Spain ................................. 8901942

[51] Int. Cl.$^5$ ............................................. E01C 19/28
[52] U.S. Cl. ..................................... 404/117; 180/20; 404/122
[58] Field of Search ............... 404/103, 117, 130, 122; 74/61, 87; 172/40; 180/20

[56] References Cited

U.S. PATENT DOCUMENTS

| 3,598,029 | 8/1971 | Paramythioti | 404/117 |
| 4,266,884 | 5/1981 | Tuneblom | 404/122 |
| 4,577,995 | 3/1986 | Sadahiro | 404/130 X |
| 4,619,552 | 10/1986 | Sadahiro | 404/117 |

FOREIGN PATENT DOCUMENTS

| 238580 | 8/1963 | U.S.S.R. | 404/117 |
| 706479 | 12/1979 | U.S.S.R. | 404/117 |
| 873419 | 7/1961 | United Kingdom | 404/117 |

Primary Examiner—David J. Bagnell
Attorney, Agent, or Firm—Darby & Darby

[57] ABSTRACT

The present invention relates to a vibration insulation system for a self-propelled vibrating compactor providing a chassis supporting a roller and a chassis supporting both a cabin and elements for self-propulsion of the compactor. The chassis supporting the roller is connected to the chassis supporting both the cabin and the elements for self-propulsion by a series of shock absorbers connected to a cross bar, whereby vibrations of the roller are prevented from being transmitted to the chassis supporting the cabin and self-propulsion elements.

4 Claims, 8 Drawing Sheets

VIBRATION INSULATION SYSTEM IN COMPACTORS

OBJECT OF THE INVENTION

As is expressed in the title of this specification, the present invention refers to a vibration insulation system in compactors, which is useful in self-propelled vibrating compactors in such a way that it avoids vibrations of the compacting roller, mounted on a chassis, from being transmitted to the cabin where the operator who runs the machine is and to the frame on which the diesel engine and the remaining elements thereof are mounted.

By means of the use of the system proposed in the present specification, it is achieved that the greater vibration amplitude obtained in the machine, is not transmitted to the cabin and frame of the engine, such that the on-time to obtain a perfect compacting of the ground is considerably reduced, with regard to conventional compactors.

BACKGROUND OF THE INVENTION

Conventional self-propelled vibrating compactors, consisting of a chassis on which the compacting roller is mounted and the chassis on which the operator's cabin is mounted for operation thereof and the elements required for its self-propulsion have a limited vibration amplitude of the compacting roller, due to the fact that if said vibration amplitude is exceeded, it is transmitted to the operator's cabin and to the elements for self-propulsion of the compacting machine.

Thus, in order to prevent the transmission of vibrations, the compacting roller remains mounted elastically on the chassis. For this purpose a series of shock absorbers that prevent the transmission of the vibrations to the chassis where the cabin of the operator who operates the machine and the elements for the self-propulsion thereof remain is used.

Given that the vibration amplitude that is achieved is small, the operating time to achieve perfect compacting of the ground, is high, thus wear increases.

DESCRIPTION OF THE INVENTION

Hence, in order to improve the performance of self-propelled vibrating compactors and to increase the vibration amplitude without the vibrations being transmitted to the frame on which the cabin for the operator and the elements for the self-propulsion of the machine are mounted, in accordance with the invention the cross member of the chassis on which the compacting roller is mounted is connected to the chassis on which the cabin is mounted by means of some elastic shock absorbers on each side, which absorb vibrations. They prevent the vibrations from being transmitted to the chassis on which the cabin is mounted.

Thus, said shock absorbers act as semi-free pivoting points, absorbing the vibrations and permitting the rotation of the compacting roller and of the chassis on which it is mounted.

The chassis on which the cabin and the elements for self-propulsion are mounted consists of the connection of two frames, one of which is connected to the chassis on which the compacting roller is mounted without any vibration insulation between them and the second one, above it, upon which the cabin and the elements for self-propulsion are mounted. Both cited frames are connected to each other in such a way that the transmission of the vibrations from the stationary frame to the chassis on which the compacting roller is mounted and the frame on which the cabin and the elements for self-propulsion are mounted is avoided.

Thus, the frame that is connected to the chassis of the compacting roller has, at the end opposite said connection, some arms that are connected to the frame above it upon which the cabin is mounted by means of some springs. They are guided between the corresponding crossbars of each one of the frames. Likewise, the top frame has a plate linked to it which extends at the bottom. Some shock absorbers remain between the bottom frame and the plate and in the free end thereof there are some other shock absorbers placed between it and a plate linked to the bottom frame.

Upon effecting the connection of the two frames in the described manner, the transmission of the vibrations from one frame to the other is avoided. Thus it is possible to attain a high impact self-propelled vibrating compactor characterized by having a greater vibration amplitude than conventional compactors with a performance much higher than conventional ones.

The fact that the cross member of the chassis on which the compacting roller is mounted is connected to the chassis of the cabin by means of bearings is also characteristic of the invention. These bearings absorb the vibrations of the chassis on which the compacting roller is mounted, avoiding transmission of the vibrations to the chassis on which the cabin and the elements for self-propulsion are mounted.

Thus, said bearings act as the free pivoting point of the compacting roller and of the chassis on which it is mounted.

In order to attain perfect stability in compactors which are provided with the described system, they can be provided with two pairs of conventional wheels of the same diameter, in the cabin chassis, or else, the cabin chassis can be provided with a pair of conventional wheels and a pair of small diameter wheels in the rear part thereof or in the part of connection to the chassis where the compacting roller is mounted.

Likewise, the compacting machine can be provided with a pair of conventional wheels in the chassis where the cabin is mounted and have in the chassis of the compacting roller a pair of small diameter wheels placed in the front part for the stability thereof.

In this case, a frame formed by a cross member which is connected to the chassis by means of some bearings and a pair of crossbars between whose free ends the compacting roller is mounted is projectionally connected to the chassis of the compacting roller. Thus, the free pivoting points of the compacting roller and of its frame will be the bearings through which the frame is connected to the chassis in order to prevent the transmission of vibrations.

The connection of the structure upon which the compacting roller is mounted is done in the described manner and thus we can obtain a high impact self-propelled vibrating compactor, also known as a swinging hammer, characterized by having a greater vibration amplitude than conventional compactors, with a much higher performance.

In order to complement the description which is going to be made hereinafter and for the purpose of providing a better understanding of the features thereof, the present specification is accompanied by a series of drawings in whose figures the most significant details of the invention are represented:

BRIEF DESCRIPTION OF THE DESIGNS

DESCRIPTION OF A PREFERRED EMBODIMENT

Figure 1:
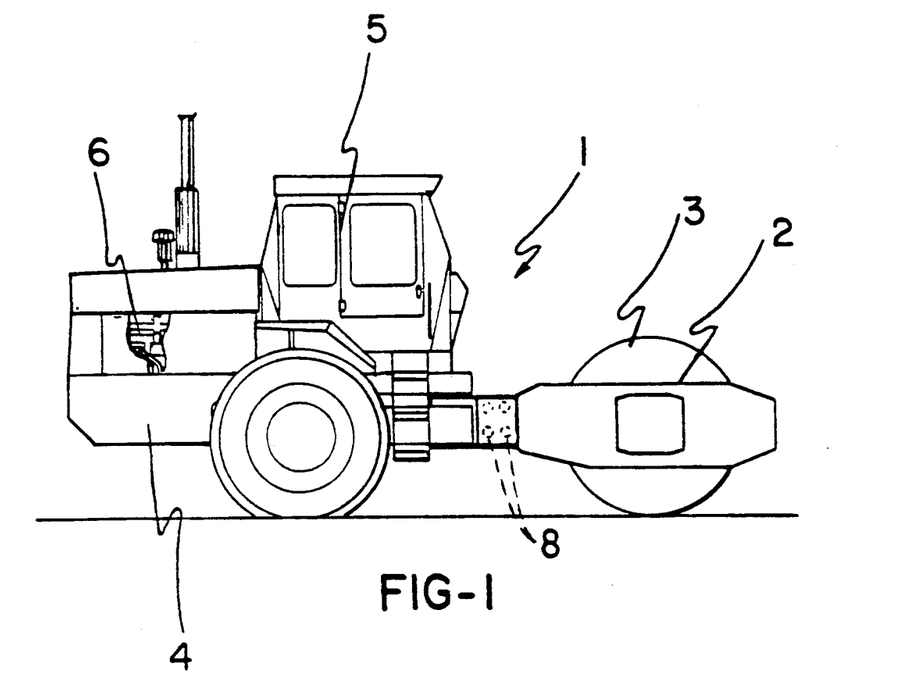
FIG. 1. It shows a side raised view of a compactor such that the connection between the chassis on which the compacting roller is mounted and the chassis on which the cabin and the elements for self-propulsion are mounted is done by means of some elastic shock absorbers, which absorb the vibrations avoiding transmission thereof to the chassis on which the cabin is mounted.
Figure 2:
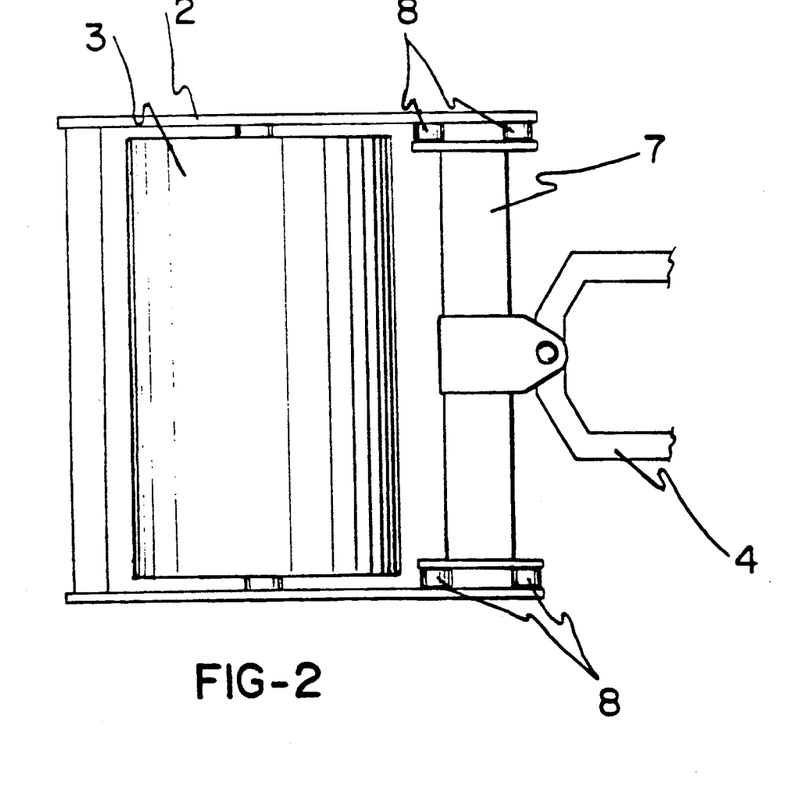
FIG. 2. It shows a plan view of the chassis on which the roller of the above figure is mounted, wherein one observes how the connection of the chassis on which the compacting roller is mounted and the chassis on which the cabin is mounted, is done by means of a cross member fixed to the chassis of the compacting roller through a series of elastic shock absorbers that absorb the vibrations.

In view of FIGS. 1 and 2 and in accordance with the numbering used, we can see how the compactor (1) is formed by the chassis (2) upon which the compacting roller (3) is mounted. The roller is connected to the chassis (4) upon which the cabin (5) for the operator who operates the machine and the elements (6) for self-propulsion are mounted.

The connection of the chassis (2) of the compacting roller (3) and the chassis (4) on which the cabin (5) is mounted is done by means of the cross member (7) which is connected to the chassis itself (2) of the roller (3), through the shock absorbers (8). Said elastic shock absorbers are the ones that absorb the vibrations of the compacting roller (3) and of the chassis (2), avoiding transmission of the vibrations to chassis (4.)

Having effected the connection of chassis (2) and chassis (4) in the described manner, transmission of the vibrations of the chassis (2) to chassis (4) is avoided. Thus it is possible to achieve a high impact self-propelled vibrating compactor also known as a swinging hammer which is characterized by having a greater vibration amplitude than conventional compactors with a performance superior than that of conventional ones too.

Figure 3:
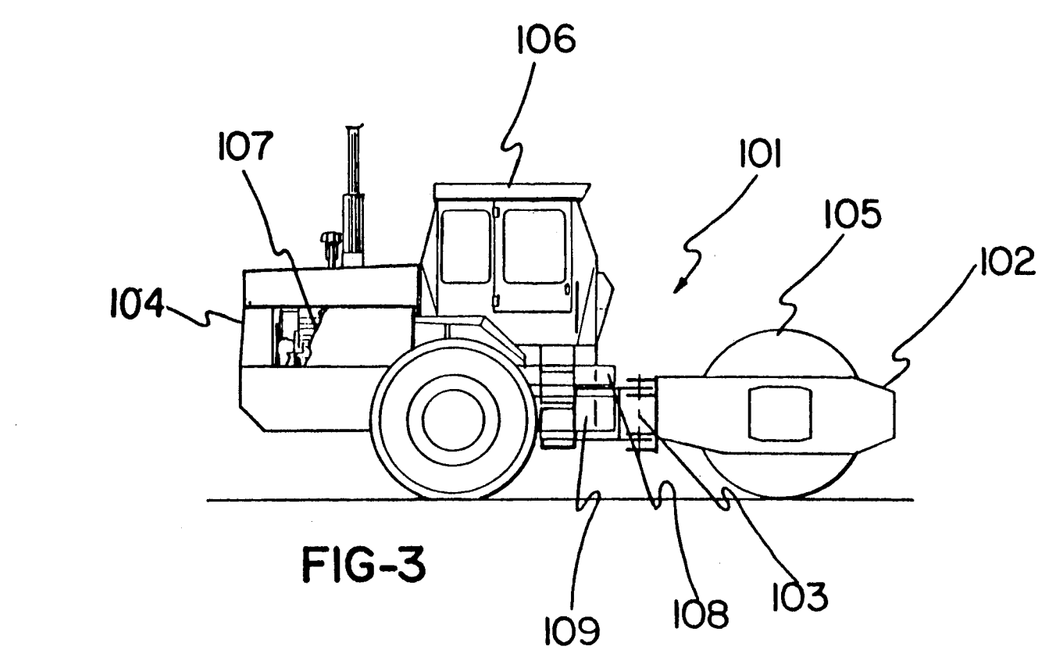
FIG. 3. It shows a side raised view of a high impact compactor in which the chassis on which the compacting roller is mounted is connected to a frame, above which is a second frame on which the cabin and the elements for self-propulsion are mounted, both frames remaining perfectly insulated to prevent the transmission of vibrations from one to the other.
Figure 4:
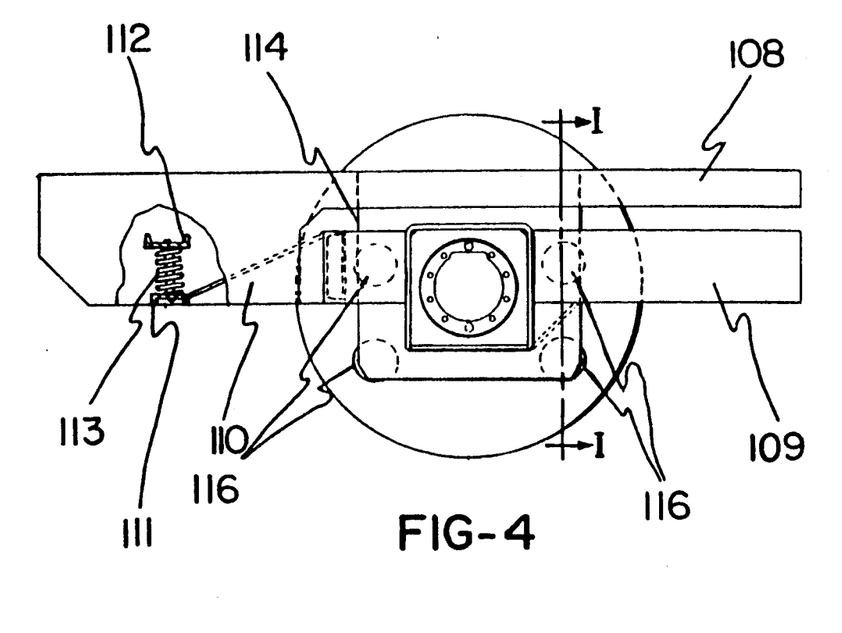
FIG. 4. It shows a side raised view corresponding to an enlarged detail of FIG. 3 of the two frames that are insulated from each other to avoid the transmission of vibrations. It can be seen that a series of shock absorbers are placed between the plate linked to the upper frame and to the bottom frame between which a series of shock absorbers are placed.
Figure 5:
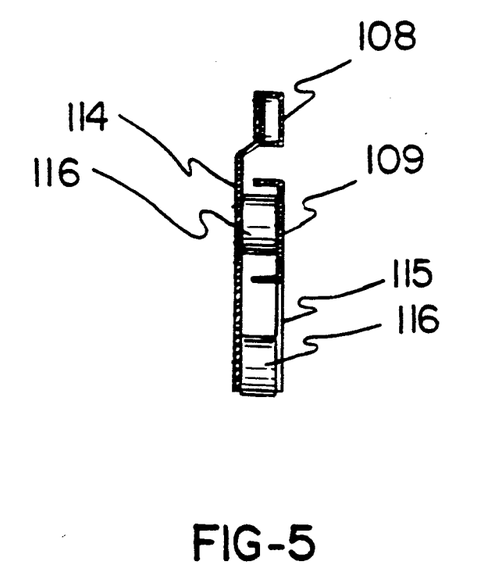
FIG. 5. It shows a sectional view according to axis I—I of FIG. 4 and it can be seen that some shock absorbers are placed between the bottom frame and the plate linked to the upper frame and other shock absorbers are placed between both plates linked to the respective frames.
Figure 6:
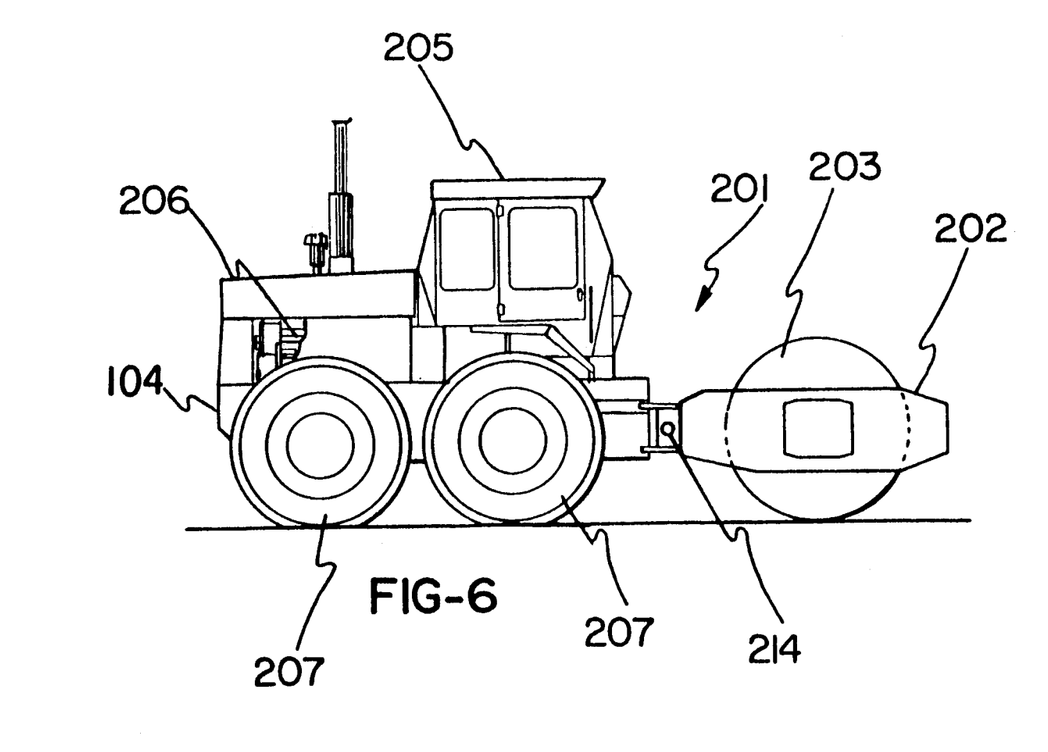
FIG. 6. It shows a side raised view of a compactor with two pairs of identical diameter wheels on the chassis on which the cabin and the elements for self-propulsion are mounted, the compacting roller having the free pivoting point concerning the cross member of connection with the chassis of the cabin.
Figure 7:
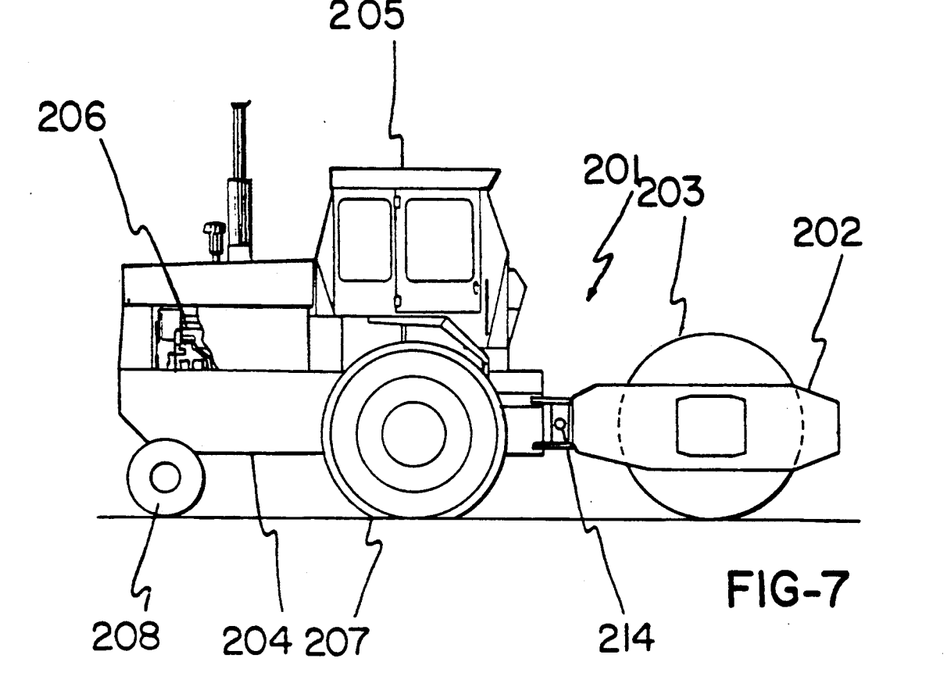
FIG. 7. It shows a side raised view of a compactor with a pair of conventional wheels and another pair with a smaller diameter in the rear part in the chassis on which the cabin is mounted, the compacting roller having the free pivoting point concerning the cross member of connection with the chassis of the cabin.
Figure 8:
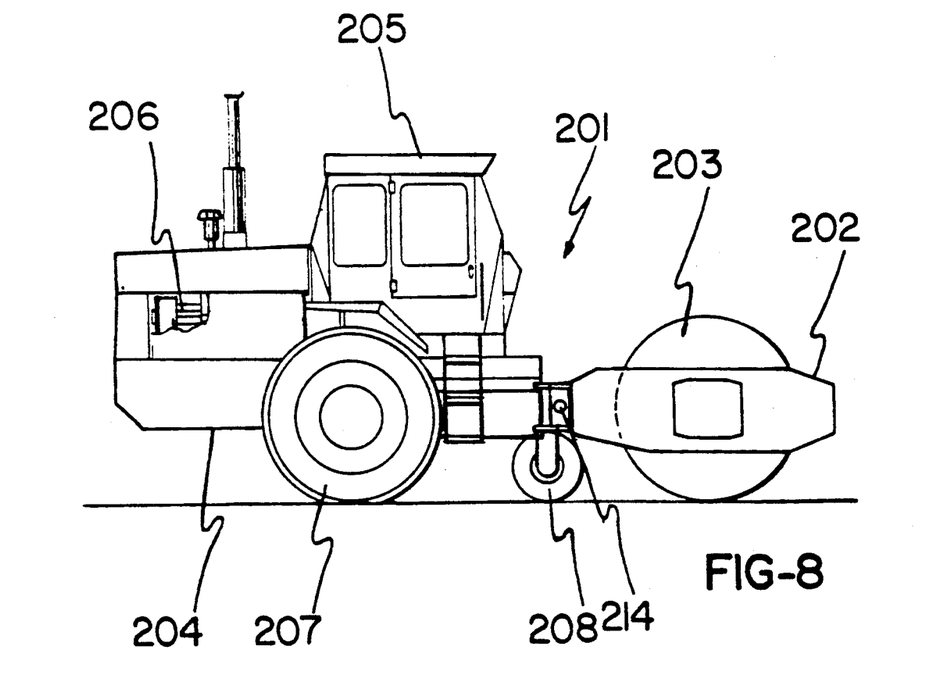
FIG. 8. It shows a side raised view of a compactor with a pair of conventional wheels and another pair with a smaller diameter in the front part in the chassis on which the cabin is mounted, the compacting roller having the free pivoting point concerning the cross member of connection with the chassis of the cabin.

In the embodiment shown in FIGS. 3, 4 and 5, we can see how the high impact self-propelled vibrating compactor (101), also called a swinging hammer, consists of chassis (102) on which the compacting roller (105) is mounted and which remains swivably connected by the axis (103) to chassis (104) by the frame (109.)

The chassis (104) is formed by frames (109) and (108) and the cabin (106) for the operator who operates the machine (101) and the elements (107) required for the self-propulsion thereof are mounted on the latter.

The two frames (108) and (109) which form the chassis (104) are connected by means of the arms (110) that the frame (109) has by some springs (113) placed between the crossbars (111) and (112) connected respectively to the frames (109) and (108) by means of plates (114) and (115) linked to the frames (108) and (109) respectively, in such a way that between the plate (114) and the frame (109) there are some shock absorbers (116). Between the free ends of the plates (114) and (115) there are other shock absorbers (116.)

Upon effecting the connection of frames (108) and (109) in the described manner, just as we have said above in connection with FIGS. 1 and 2, transmitting of the vibrations from the frame (109) to the frame (108) on which the cabin (106) and elements (107) for self-propulsion of the compactor (101) is avoided. Thus, the vibrations transmitted to the frame (109) by the chassis (102) will be absorbed by the springs (113) and the shock absorbers (116), preventing the transmission thereof to the frame (108.)

This we obtain in a high impact self-propelled vibrating compactor wherein the vibrations amplitude is approximately twice the vibration amplitude obtained with conventional compactors that the vibrations are not transmitted to the operator's cabin and to the elements for self-propulsion.

The high impact compactor has a yield much greater than that of conventional compactors and it can do the same work in much less time, which represents a great savings.

Now referring to FIGS. 6 to 11 and in accordance with the numbering used therein, we can see how the high impact self-propelled vibrating compactors (201) are generally formed by a chassis 202 on which the compacting roller (203) is mounted and a chassis (204) on which the cabin (205) and the elements for self-propulsion (206) are mounted, in such a way that the free pivoting point of the compacting roller (203) of the chassis (202) on which it is mounted is located in the cross member (209) which, as an axis, (214) acts as a connection between both chassis.

In order to avoid the instability of the compacting machines, (201) the chassis (204) on which the cabin (205) is mounted remains on two pairs of wheels (207) with the same diameter, or else, on a pair of conventional wheels (207) and other wheels (208) with a smaller diameter. Likewise, it is possible that the chassis (202) of the compacting roller is the one that rests on a pair of small diameter wheels (208) placed in the front part thereof.

Figure 10:
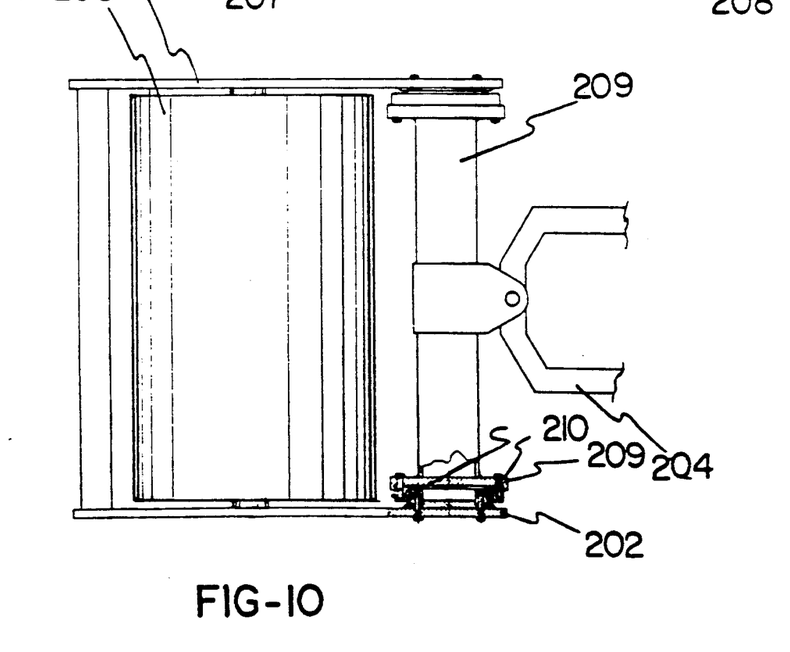
FIG. 10. It shows a plan view of the chassis on which the compacting roller is mounted. It corresponds to the embodiments of FIGS. 6, 7 and 8. The cross member of connection to the chassis remains connected to the chassis by means of some bearings that absorb the vibrations, said cross member acting as the free spin axis of the chassis of the compactor.

The connection of chassis (202) and chassis (204) is done by means of the cross member (209) which connects to chassis (202) by means of bearings (210) which will absorb the vibrations of chassis (202), preventing the transmission of the vibrations to chassis (204), in such a way that chassis (202) and roller (203) turn in connection with axis (214.)

Figure 9:
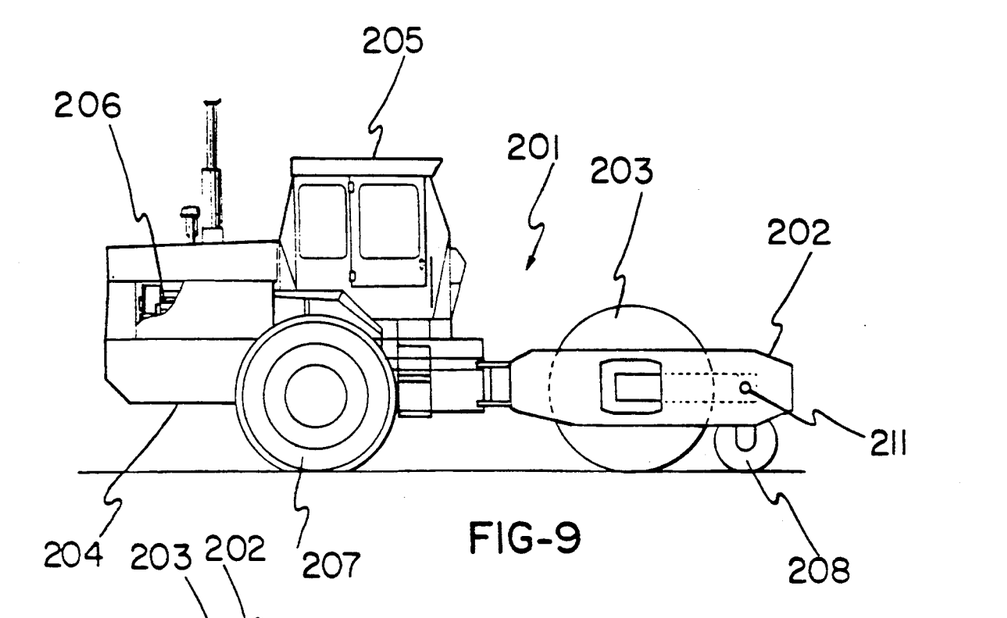
FIG. 9. It shows a side raised view of a compactor with a pair of conventional wheels in the chassis on which the chassis is mounted and the chassis on which the compacting roller is mounted remains resting on two small diameter wheels. The frame on which the compacting roller is mounted with free rotation concerning the bearings through which it is connected to the chassis, which is turn is fastened to the chassis of the cabin remains overhanging.
Figure 11:
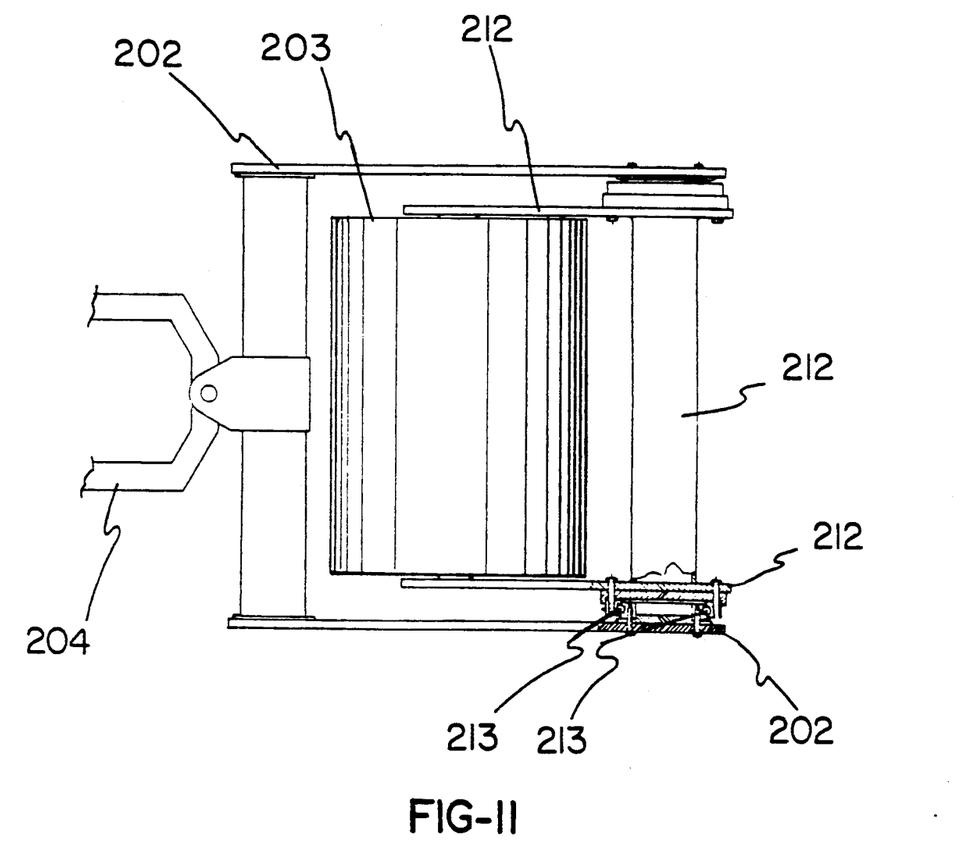
FIG. 11. It shows a plan view of the chassis on which the compacting roller corresponding to FIG. 9 is mounted. One can see how the compacting roller remains mounted on an overhanging frame concerning the connection chassis, the frame having the free spin axis concerning the bearings of connection thereof to the chassis.

In the event that chassis (202) on which the compacting roller (203) is mounted remains supported on a pair of small diameter wheels (208) with the free spin axis (211) thereof in the front part it is formed in such a way that chassis (202) has inside an overhanging frame (212) connected to it by means of bearings (213.) Thus, the vibrations of frame (212) and of the compacting roller are absorbed by said bearings (213) preventing transmission of said vibrations to chassis (202) which is connected to chassis (204). The station of the operator who operates the machine and the elements for self-propulsion remain isolated.

The compactors made this way prevent the transmission of vibrations to the chassis on which the cabin is mounted, thus obtaining a high impact self-propelled vibrating compactor with an outstanding greater vibration amplitude than that of conventional compactors, but with a performance much greater than that of the latter.

We claim:

1. A vibration insulation system for a self-propelled vibrating compactor comprising:
    a first chassis supporting a cabin and means for self-propulsion of the compactor;
    a second chassis mounting a roller;
    a plurality of shock absorbers for absorbing vibrations;
    a cross bar having one end connected to said first chassis and having the other end mounted with said plurality of shock absorbers to said second chassis for absorbing vibrations of said second chassis, thereby preventing said vibrations from being transmitted to said first chassis.

2. A vibration insulation system for a self-propelled vibrating compactor comprising:
    a first chassis supporting a cabin and means for self-propulsion of the compactor;
    a second chassis mounting a roller;
    said first chassis having an upper and a lower frame, said upper frame being connected to said cabin and to said means for self-propulsion and said lower frame being connected to said second chassis, said upper and lower frames being connected with a plurality of guide springs positioned between a pair of cross bars and with a pair of connecting plates such that a first plurality of shock absorbers are positioned between one end of said pair of connecting plates connected to said upper and lower frames for absorbing vibrations and at the other end of said pair of plates, a second plurality of shock absorbers are positioned for absorbing vibrations.

3. A vibration insulation system for a self-propelled vibrating compactor comprising:
    a first chassis supporting a cabin and means for self-propulsion of the compactor;
    a second chassis mounting a roller;
    a cross member connecting said first chassis to said second chassis, said cross member being connected to said second chassis with bearing means so that said second chassis rotates around an axis parallel to said cross bar and wherein said bearing means absorbs vibrations of said roller.

4. A vibration insulation system according to claim 3, wherein said roller is mounted to said second chassis with a frame projectionally connected to said second chassis, said frame being connected to said second chassis with second bearing means, thereby allowing free rotation of said roller.

* * * * *